Figure 1:
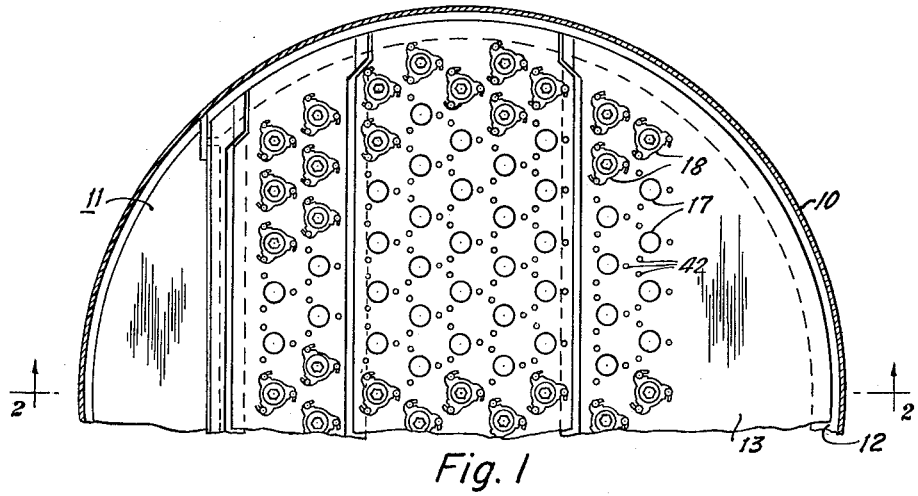

Dec. 19, 1961     H. C. GLITSCH     3,013,782
FLUID CONTACT APPARATUS
Filed Sept. 8, 1958     3 Sheets-Sheet 1

INVENTOR
Hans C. Glitsch

BY Shley & Shley

ATTORNEYS

Dec. 19, 1961

H. C. GLITSCH 3,013,782

FLUID CONTACT APPARATUS

Filed Sept. 8, 1958

3 Sheets-Sheet 2

INVENTOR
Hans C. Glitsch

BY *Ashley & Ashley*

ATTORNEYS

Dec. 19, 1961     H. C. GLITSCH     3,013,782
FLUID CONTACT APPARATUS

Filed Sept. 8, 1958                           3 Sheets-Sheet 3

INVENTOR
Hans C. Glitsch

BY Ashley & Ashley

ATTORNEYS

3,013,782
FLUID CONTACT APPARATUS
Hans C. Glitsch, Dallas, Tex., assignor to Fritz W. Glitsch & Sons, Inc., Dallas, Tex., a corporation of Delaware
Filed Sept. 8, 1958, Ser. No. 759,803
8 Claims. (Cl. 261—114)

This invention relates to new and useful improvements in fluid contact apparatus and more particularly to an improved fluid contact tray having a multiplicity of flow passages for providing substantially uniform distribution of the ascending fluid and intimate contact and thorough mixing of said fluid with the liquid on the tray.

Fluid contact trays, which are superimposed in towers or other vessels, are utilized in petroleum and chemical processes, such as fractionation, absorption and distillation, wherein gases or vapors and liquids or liquids and liquids are contacted for separation, recovery, refinement or purification. A predetermined level of liquid is maintained on each tray which has a multiplicity of openings to permit gas, vapor, or other fluid therebelow to flow therethrough into contact with the liquid. It is more or less conventional to mount bubble caps on chimneys or risers above the tray openings for directing the fluid laterally through the liquid on the tray. Due to the inherent limitations of bubble caps, closures of the valve type have been employed for controlling the flow of the fluid through the tray openings in attempts to provide more uniform distribution of said flow and intimate contact and thorough mixing of said fluid with the liquid. These closures are intended to regulate the areas of the flow passages in accordance with differential ranges of pressures across the tray, that is, the differences between the pressures above and below said tray, and said closures have been weighted in various manners for increasing the operating efficiency throughout wider ranges of capacities.

Since the operating characteristics of a valve type tray are governed by the nature and weight of its closures, the latter have a material bearing on the performance, capacity and efficiency of the tray. When closures of different weights are used for selected vapor ports or orifices, the opening movement of the heavier closures is retarded with the result that only a portion of the vapor orifices function during operation within a range between the minimum capacity of the tray and the percentage of its maximum capacity necessary to open said heavier closures. Manifestly, the minimum capacity is determined by the opening of the lightest closures of the tray. A valve type tray, operating through a range of its capacity, is subject to frequent opening and closing of its closures whereby said closures tend to trap and/or pump liquid through their vapor orifices to the tray below. This action is magnified by fluctuating loads or causes pulsations at various percentages of maximum tray capacity with consequent loss of operating efficiency.

It is generally accepted by the majority of chemical process engineers that the velocity head, i.e., the velocity of the fluid entering the liquid, through or across a tray has a direct bearing on the efficient performance or efficiency of the tray. Also, it is generally recognized that the pressure drop or differential across a tray is critical under many operating conditions. Therefore, it is desirable, and often essential, to attain the optimum vapor velocity at the point of contact or mixing of the fluid with the liquid on a tray without creating an excessive pressure drop across the tray. Since the product demanded from a fluid contact tower usually varies with the season and the supply in storage, economy requires the tower and its trays to have a wide range of capacity with respect to vapor and liquid flow rates and this range may extend from low vapor-high liquid rates to high vapor-low liquid rates.

Accordingly, it is a primary object of this invention to provide an improved fluid contact apparatus having novel means for regulating the areas of its flow passages in accordance with differentials in pressures to produce substantially uniform distribution of the flow of gas, vapor or other fluid and intimate contact and thorough mixing of the ascending fluid with the liquid throughout a wide range of capacity while maintaining the efficiency of the apparatus, it being contemplated that the fluid may be a liquid as well as a gas or vapor.

An important object of the invention is to provide an improved fluid contact tray having means for controlling the areas of its flow passages to permit variations in the rate of fluid flow without causing an excessive pressure drop across the tray whereby the velocity head or velocity of the fluid entering the liquid can be maintained at an optimum to insure good tray efficiency and whereby the tray has a wide range of capacity which may extend from low fluid-high liquid flow rates to high fluid-low liquid flow rates.

A particular object of the invention is to provide an improved fluid contact tray having a multiplicity of orifices, openings or ports of appreciable size and light weight closures for sealing the orifices against the leakage of liquid and permitting the passage of the ascending fluid therethrough at a low percentage of the total tray capacity, together with means for limiting the movement of the closures to two or more stages whereby a predetermined pressure differential across the tray opens said closures partially to provide restricted flow passages for accommodating a minimum fluid flow rate and whereby an increased pressure differential opens said closures additionally or fully to enlarge the areas of the flow passages for accommodating a greater or desired maximum fluid flow rate.

An object of the invention is to provide an improved tray, of the character described, which permits a controlled range of "through-put" capacity with respect both to fluid and liquid, which allows the control of tray efficiency over a wide range of operations, which minimizes pressure drop and utilizes the pressure drop at the most desirable point, which minimizes parasitic pressure drops at other points, which makes possible the control and compensation for hydraulic gradient as well as liquid resident time and volume, which minimizes the effect of corrosion and erosion on the performance of said tray, and which controls the amount and point of liquid entrainment by the fluid.

Another object of the invention is to provide an improved tray, of the character described, wherein the fluid flow control means is readily removable to permit the characteristics of the tray to be changed in accordance with performance requirements as well as cleaning of the tray and replacement of parts, the construction and/or arrangement of said means being capable of being altered whenever desired to vary the travel of the closures or the magnitude of any one of the stages of movement of said closures or the number thereof and permitting the use of corrosion and erosion resistant material.

A further object of the invention is to provide an improved tray, of the character described, wherein the fluid flow control means is in the nature of a ballast unit for each orifice and includes a closure for the orifice, one or more ballast members overlying the closure in spaced relationship, and stop means for limiting the upward travel of the ballast member and closure, each closure being freely movable upwardly into engagement with its overlying ballast member to provide a flow passage of a predetermined area for accommodating a minimum and maximum fluid flow rate through its orifice, each ballast member being freely movable upwardly into engagement with the stop means or an overlying ballast member to permit additional lifting of the closure and thereby increase the area of the flow passage for accommodating a larger minimum and maximum fluid flow rate through the orifice, whereby the fluid flow is in stages for more uniform distribution thereof, optimum velocity head and greater tray efficiency over a wider range of capacity.

An object of the invention is to provide an improved tray, of the character described, wherein the ballast members may vary in weight and/or spacing from the closures and/or stop means in accordance with desired operating conditions and range of capacities as well as the position and nature of the tray, the variance being between adjacent ballast members, members at different portions of said tray or from tray to tray.

Another object of the invention is to provide an improved tray, of the character described, wherein some or all of the ballast units have means for directing a portion of the fluid laterally to prolong its contact with the liquid on the tray and to impart movement to said liquid in a given direction, such as toward the downstream portion of said tray, without interfering with the substantially uniform distribution of said fluid.

A further object of the invention is to provide an improved tray, of the character described, wherein the fluid directing means of the ballast units may be in the form of upright baffles extending between the stop means and floor of the tray adjacent the perimeters of the orifices, the area, dimensions, shape and position of each baffle being subject to variation in accordance with the extent of control desired and/or required whereby the baffle may be of any suitable height or length, be spaced from the tray floor or stop means, be continuous or be interrupted by openings or voids.

Another object of the invention is to provide an improved tray, of the character described, wherein the closures are light in weight so as to be readily liftable by the ascending fluid, but which may range from substantially zero to any practicable weight, it being contemplated that the closures may be omitted in some installations whereby the lower ballast members function as partial closures for the vapor orifices.

A construction designed to carry out the invention will be hereinafter described, together with other features of the invention.

Figure 2:
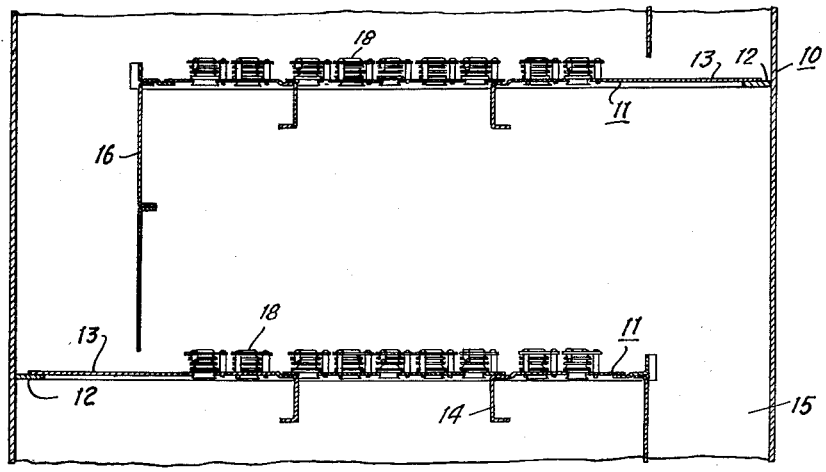
Figure 3:
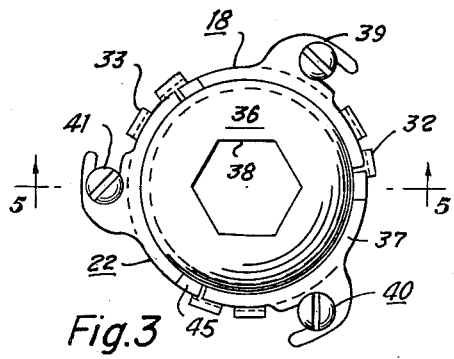
Figure 4:
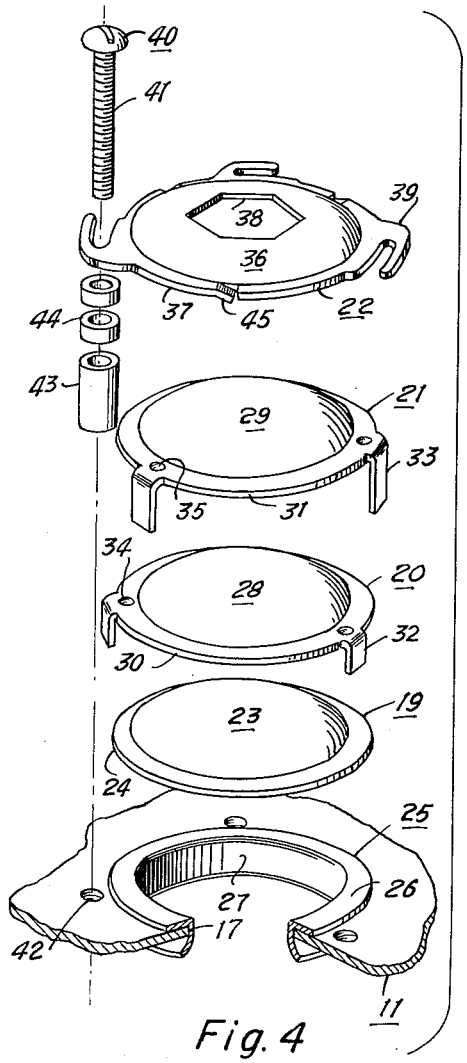
Figure 5:
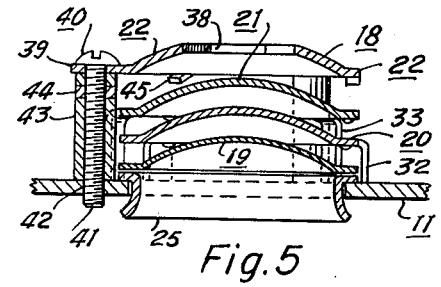
Figure 6:
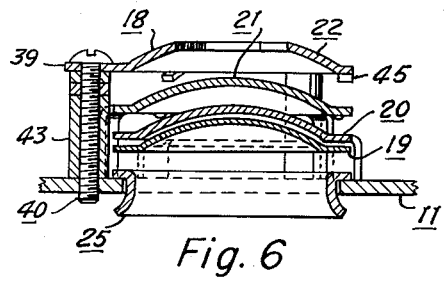
Figure 7:
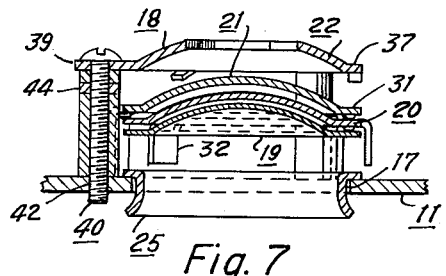
Figure 8:
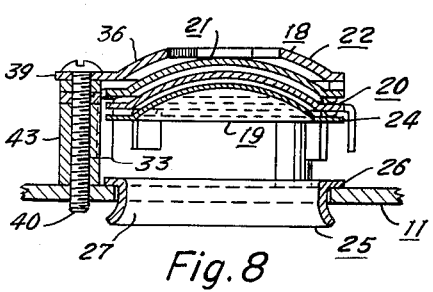
Figure 9:
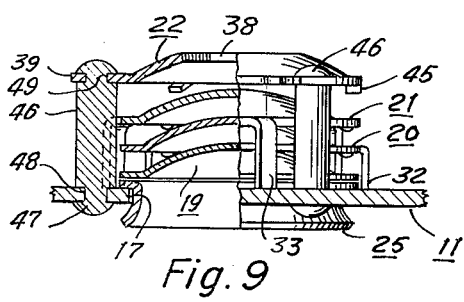
Figure 11:
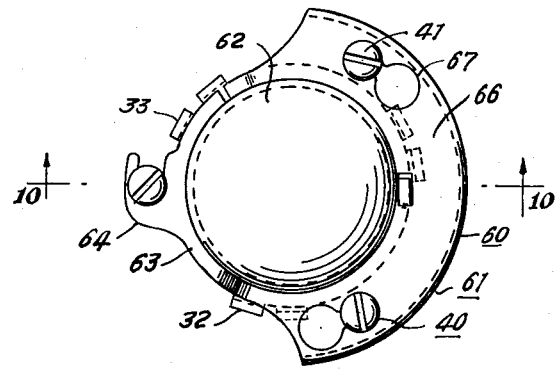
Figure 12:
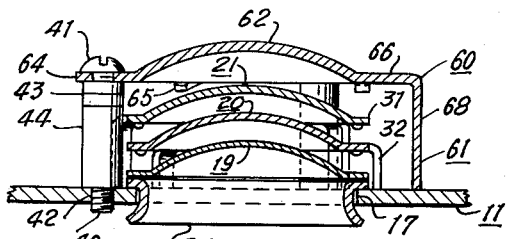
Figure 14:
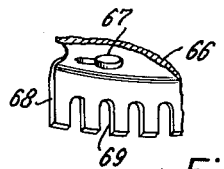
Figure 13:
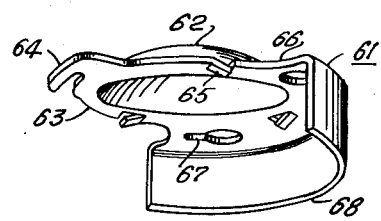
Figure 10:
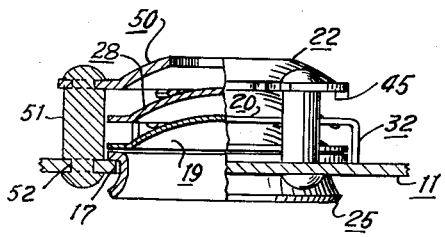

The invention will be more readily understood from a reading of the following specification and by reference to the accompanying drawings, wherein examples of the invention are shown, and wherein:

FIG. 1 is a horizontal, cross-sectional view of a portion of a fluid contact tower showing in plan a tray constructed in accordance with the invention, FIG. 2 is a transverse, vertical, sectional view of a portion of the tower and its trays, FIG. 3 is a top plan view of one of the ballast units, FIG. 4 is an exploded, perspective view of the ballast unit, and a portion of the tray and one of its vapor orifices, FIG. 5 is a transverse, vertical, sectional view, taken on the line 5—5 of FIG. 3, of the ballast unit mounted on the tray in overlying relation to one of its orifices, FIG. 6 is a view, similar to FIG. 5, showing the closure lifted from the orifice seat, FIG. 7 is a view, similar to FIG. 5, showing the lower ballast member lifted into engagement with the upper ballast member, FIG. 8 is a view, similar to FIG. 5, showing the upper ballast member lifted into engagement with the travel stop, FIG. 9 is a transverse, vertical, sectional view, partly in elevation, of a ballast unit having a modified mounting, FIG. 10 is a view, similar to FIG. 9, showing a modified ballast unit, FIG. 11 is a top plan view of a ballast unit having a directional travel stop, FIG. 12 is a transverse, vertical, sectional view, taken on the line 12—12 of FIG. 11, of the ballast unit and travel stop mounted in overlying relation to a vapor orifice, FIG. 13 is an underside, perspective view of the directional travel stop, and FIG. 14 is a fragmentary view showing a portion of a modified directional travel stop.

In the drawings, the numeral 10 designates the cylindrical, upright shell or wall of a tower or vessel of the type used in petroleum and chemical processes, such as fractionation, absorption and distillation, wherein gas or vapors and liquids or liquids and liquids are contacted for separation, recovery, refinement or purification. The tower may be of any desired construction, diameter or height and includes a plurality of superimposed decks or trays 11 which extend transversely across the interior of said tower. It is noted that the quantity and spacing of the trays vary in accordance with the size and particular use of the tower and that the structure and relationship of the illustrated trays are typical. Each tray 11 may be supported within the tower by a substantially annular member or ring 12, which is secured to the internal surface of the wall 10 and projects radially inward therefrom, and may include one or more deck plates or floor sections 13 having their outer portions resting on the ring (FIGS. 1 and 2). Although shown as having integral supports 14 and overlapping adjacent margins, the plates may be mounted in any suitable manner and may be confined against displacement or fastened to one another and to the ring 12 in various ways. Preferably, one end of each tray terminates short of the tower wall to provide an opening 15 for a weir type downcomer 16 which may be formed in sections and which is adapted to permit liquid to overflow from the tray to the tray therebelow. A desired level of liquid is maintained on each tray by adjusting the height of its overflow or outlet weir. As shown, it is customary to stagger or alternately dispose the trays and their downcomers.

For accommodating the upward flow of gas, vapor or other fluid into contact with the liquid, each tray 11 has a multiplicity of openings, ports or orifices 17 of appreciable size which usually are equally spaced and which may be arranged in rows. Although shown as being circular, the orifices 17 may be of any desired contour and may vary in size. A ballast assembly or unit 18 is provided for each orifice to control its flow area in accordance with differentials in pressures across, i.e., above and below, the tray whereby the distribution of the flow of the ascending fluid is substantially uniform to insure intimate contact and thorough mixing of said fluid with the liquid on said tray. Each ballast unit includes a loose closure 19 for the orifice, one or more ballast members 20 and 21 overlying the closure in spaced relationship and a travel stop 22 for limiting upward movement of said closure and ballast members (FIGS. 4–8). Since its primary function is to seal the orifice against the leakage of liquid, the closure 19 is extremely light in weight so as to be capable of being unseated by a predetermined minimum pressure differential across the tray. This weight may range from substantially zero to any practicable amount, it being contemplated that the closure may be omitted in some installations with the result that the lower ballast member 20 would function as a partial closure for the orifice 17.

Each closure 19 is complementary to its orifice, having a slightly greater diameter or dimensions, and is in the form of a thin cover element or plate which is strengthened by its major portion 23 being dished or concavo-convex and by a narrow, flat perimetrical margin or lip 24 (FIG. 4). As shown in FIG. 5, the lip overlies the perimeter of the orifice with the convex side of the closure directed upwardly. If desired, an insert seat 25 may be provided for each orifice and have a flat, narrow flange 26 overlying its perimeter for engagement by the lip 24 of the closure. The seat has an upright portion 27 depending from its flange through the orifice and flared outwardly in spaced relation to the underside of the tray 11 for minimizing turbulence of flow. It is pointed out that the seat, closure, entire ballast unit or any part thereof may be formed of corrosion and/or erosion resistant material regardless of the material of the tray.

The ballast members 20 and 21 may be in the form of disks or plates complementary to the closure 19 and to each other and, preferably, have similar concavo-convex portions 28 and 29 and marginal lips 30 and 31, respectively (FIG. 4). A plurality of upright legs or lugs 32 and 33 depends from the exteriors of the lips 30 and 31, respectively, for engaging the tray 11 to support and space the members from the closure and each other. The legs 33 of the upper ballast member are of greater length than the legs 32 of the lower ballast member and it is noted that the length of both sets of legs may be varied to alter the spacing of the members. In order to minimize the effect of surface tension, the lips 30 and 31 have a plurality of downwardly-directed dimples or projections 34 and 35 for respective engagement by the lips 24 and 30.

The travel stop 22 includes a similar concavo-convex element or dished plate 36 having a flat marginal lip 37 and a central opening 38 which is polygonal for engagement by a suitable tool (not shown). A plurality of hook-type lugs or ears 39 project laterally outward from the lip 37 for detachable connection with upright supports or posts 40 upstanding from the tray 11. Each post 40 may include a screw 41 threaded in an opening 42 in the tray and having a spacer sleeve or tube 43 confined thereon between said tray and each ear 39 to support the travel stop. As shown by the numeral 44, the sleeve may be formed in sections or coact with short sleeves or collars to permit variation in the elevation or spacing of the travel stop 22 above the tray. A plurality of lugs or projections 45 are struck from the lip and bent downwardly for engagement by the lip 31 of the ballast member 21 to limit upward movement thereof as well as the underlying member 20 and closure 19. In addition to preventing adherence of the upper member due to surface tension, the lugs 45 may be bent upwardly or downwardly to permit accurate adjustment of the upward travel of the members and closure. It is noted that the posts 40 confine the ballast members and closures against lateral displacement without interfering with movement thereof including limited rotation when said members and closure are circular. The travel stop is readily detachable by turning the same to disconnect its ears 39 from the posts whereby the ballast members and closure may be removed for cleaning or replacement. Also, posts of different lengths may be substituted for the posts 40. As shown by the numeral 46 in FIG. 9, the upright supports or posts may be permanently attached to the tray. The modified posts are in the form of cylindrical pins having reduced lower end portions 47 extending through openings 48, similar to the openings 42, in the tray and upset below said tray in the manner of rivets. An annular, radial groove 49 is formed in the upper end portion of each post 46 for removable engagement by one of the ears 39 of the travel stop 22 to permit detachment of said stop and removal of the ballast members 21 and 20 and closure 19.

When there is insufficient pressure differential across the tray, the closures are seated as shown in FIG. 5 to prevent the excessive leakage of liquid through the orifices 17. Due to the lightness of the closures 19, only a small pressure drop or differential is required to lift said closures from the seats 25 into engagement with the ballast member 20 (FIG. 6); however, it may be desirable for the closures to be heavier than the absolute minimum. The extent of this upward travel determines the initial area of the flow passage provided by each orifice and is controlled by the length of the legs 32 of each ballast member, said area accommodating predetermined minimum and maximum rates of flow of the fluid and liquid. The weight of each ballast member is imposed on its underlying closure and halts its upward movement until the fluid flow rate exceeds the predetermined maximum. In the event that the pressure differential becomes insufficient to hold the closures open, due to decrease of the fluid flow rate and/or increase of the liquid flow rate, said closures are reseated; however, the legs of the ballast members prevent the weight of said members from assisting the seating movement of the closures whereby such movement is not sufficiently sudden to cause the trapping or "pumping" of liquid through the orifices to the tray therebelow. This provides a "cushion" effect which permits a continued upward flow of fluid through passages of reduced area, under conditions tending to close the orifices, so as to eliminate or minimize the possibility of creating a harmonic pulsation. Since the velocity of the fluid entering the liquid on a tray or the velocity head and the pressure drop or differential across the tray have direct bearings on its efficiency of operation, it is desirable, if not essential, to attain the optimum vapor velocity at the point of contact or mixing of said fluid with said liquid without causing an excessive pressure drop. Accordingly, the closures are lifted or opened in stages or steps to provide flow passages of fixed areas which make possible greater efficiency throughout predetermined ranges of tray capacity.

As shown in FIG. 7, the ballast members 20 are lifted into engagement with the overlying ballast members 21 when the flow rate of the fluid increases sufficiently to create a pressure drop across the tray in excess of the predetermined maximum of the initial stage. Each closure 19 travels upwardly with the member 20 so as to enlarge the area of the flow passage provided by its orifice 17 for accommodating flow rates having a greater minimum and maximum, and the distance of travel and area of said flow passage are regulated by the length of the legs 33. Since the combined weight of the superimposed ballast members is exerted upon each closure, the opening movement of the closure is again halted to provide a second stage or step which continues until its predetermined maximum is exceeded by the fluid flow rate. It is noted that each closure may return to its initial stage from its second stage of opening without interference from the upper ballast member, the weight of which is supported by its legs, whenever the pressure drop is insufficient to support the weight of the lower ballast member.

A third stage or step of closure movement is provided by the lifting of each upper ballast member 21 into engagement with the ears 45 of its travel stop 22 which permits upward travel of the lower member 20 and closure 19 to the full open position of the closure as shown in FIG. 8. This movement enlarges the area of the flow passage of the orifice 17 to its maximum for accommodating maximum flow rates as well as predetermined minimums. Due to variations in the pressure drop, the closures may descend and ascend from one stage to another but remain in one position throughout a more less fixed range of operation to provide the optimum velocity head or velocity of the fluid through the liquid for flow rates within such range. The lengths of the posts 40 and their spacer sleeves 43 and 44 determine the maximum travel of the closures for the desired amount of full opening of the orifices at the calculated maximum flow conditions and the optimum velocity head desired. Of course, the lugs 45 of the travel stop permit slight variation in the extent of maximum travel, while the leg heights of the ballast members and said travel stop control the stages of closure movement. In designing a fluid contact tray for selected operating conditions and range of capacities, the desired number and areas of successive stages of fluid passages can be established by the proper combination of ballast member weight and leg height and maximum travel permitted by the stops. The weights of the ballast members determine the load imposed on their respective closures subsequent to initial opening and, with their respective leg heights, contribute to the establishment of a number of stages of flow passage areas throughout the range of capacity of the tray.

As shown in FIG. 10, the upper ballast members 21 of the ballast units may be omitted so as to provide only two stages of closure movement and areas of flow passages. The modified ballast assembly or unit 50 may include the same orifice seat 17, closure 19, lower ballast member 20 and travel stop 22. Supports or posts 51, similar to the posts 46 and engaged in similar openings 52, detachably fasten the stop in spaced, overlying relation to the ballast member. Preferably, the posts 51 are of less height than the posts 40 and 46 so as to position the stop 22 at approximately the same elevation as the upper ballast member of the unit 18 whereby the member 20 engages said stop to provide a final stage of closure movement and flow passage area substantially equal to the second stage and flow area described hereinbefore. It is noted, however, that the posts and ballast member legs may vary in height to increase or decrease the spacing between the elements of the unit and the extent of the stages of movement so as to enlarge or reduce the flow passage areas. Also, the stages and areas need not be of the same magnitude since the bailast member may be positioned closer either to the closure or to the stop by changing the length of its legs and/or the posts. Obviously, the same applies to the ballast unit 18 and it is manifest that more than two ballast members may be employed.

This invention facilitates the designing of towers and trays having wide ranges of capacities with respect to fluid and liquid flow rates and these ranges may extend from low fluid-high liquid rates to high fluid-low liquid rates. The travel of the closures, the number and weights of the ballast members and the spacing of said members and travel stops may vary from unit to unit, from location to location on the same tray or from tray to tray as well as from stage to stage of movement of a single closure. Manifestly, an infinite number of combinations is possible for obtaining optimum vapor velocities at the points of contact or mixing of the fluid with the liquid on the trays without creating excessive pressure drops across said trays whereby intimate contact and thorough mixing is insured to provide greater efficiency of operation over wider ranges of capacities. It is contemplated that one or more different weights of ballast members may be employed and that various combinations of weights may be utilized with legs and posts of different heights. Also, one or more different ballast units and two or more stages of closure movement may be used in any desired arrangement. Although the use of legs for supporting the ballast members is preferred, it is noted that said members could be supported by the travel stop or posts or mounted in any suitable manner so long as there is no interference with the movement of the closures in stages or steps.

By employing ballast units of different types on the same tray, additional total or combined flow passage areas and stages of closure movement may be obtained. For example, one or both ballast members of some of the ballast units may be of different weights than one or both members of the other units and some of the latter may have one or both members of still different weights. Also, the upper and lower members may be of the same or different weights. The elevations of the travel stops and ballast members provide other possible variations, and different numbers of members of the same or different weights may be employed. In this connection, it is pointed out that all the closures and ballast members, even when identical, do not function simultaneously or in the same manner. The closures and ballast members of some of the units are lifted prior to others and some of said closures ascend or descend from one stage to another without similar movement by other closures. Usually, this condition occurs when the tray is not level or has unequal liquid levels or has its center portion exposed to greater vapor velocities than its outer or marginal portion.

In order to prolong the contact of the fluid with the liquid on the tray and to impart movement to said liquid in a given direction, such as toward the downcomer 16 and its overflow weir, it is desirable to provide certain of the ballast units with means for directing a portion of the fluid laterally in a selected direction. For accomplishing this purpose a modified bailast assembly or unit 60 is shown in FIGS. 11–13 and includes a directional travel stop 61 which is similar to the travel stop 22 and includes a similar concavo-convex or dished plate 62 and flat marginal lip 63. A hook-type lug or ear 64 projects laterally outward from the lip 63 for detachable connection with the pin or screw 41 of the post 40, and a plurality of lugs or projections 65 are struck and bent downwardly from said lip for engagement by the lip 31 of the upper ballast member 21. The lip 63 has an extension or flange 66 of greater width made integral and coextensive with a portion of its perimeter so as to extend laterally outward beyond the posts and the legs of the ballast members. Bayonet type openings 67 are formed in the flange 66 for connection with the posts in the same manner as the ear 64. A baffle or skirt 68 depends from and is coextensive with the outer margin of the flange and may engage the floor of the tray 11 as shown in FIG. 12. Although the baffle 68 may extend around substantially one-half the perimeter of the orifice 17, its area, dimensions, shape and position are subject to variation in accordance with the extent of control desired and/or required whereby said baffle may be of any suitable height or length, be spaced from the tray floor or travel stop, be continuous or be interrupted by openings or voids. As shown in FIG. 14, suitable openings 69 may be formed in the lower portion of the baffle or in any portion thereof to permit the flow of fluid therethrough and the maintenance of substantially uniform distribution of said fluid. It is noted that the extent of control may be varied by utilizing baffles of one or more different types. Except for the travel stop, the modified ballast unit 60 may be identical to the ballast units 18 or 50 and the relationship of its elements may be altered in the same manner.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A fluid contact apparatus including a liquid supporting tray having a multiplicity of orifices for the passage of ascending fluid through the tray, a closure for each orifice liftable by the pressure of the fluid below the tray, means for limiting the upward movement of each closure, means independent of each closure for regulating the movement of the closure after its initial lifting and initial opening of its orifice, the regulating means limiting initial movement of said closure and being movable therewith to permit additional lifting thereof and additional opening of its orifice, the means for limiting upward movement of each closure overlying the tray, and means depending from at least one of said movement limiting means for directing a portion of the ascending fluid laterally to prolong its contact with the liquid on said tray and to impart movement to said liquid in a given direction.

2. A fluid contact apparatus including a tray for supporting liquid flowing thereacross adapted to be mounted in a fractionating tower, said tray having a multiplicity of orifices providing passages for the flow of fluid upwardly through the tray and liquid supported thereon, a loosely confined and freely movable closure for each orifice lifted by a predetermined fluid pressure below the tray, and means for limiting the upward movement of each closure to at least two stages whereby the closure is lifted initially during the first stage for permitting a certain minimum and maximum rate of flow of the fluid through said orifice so that the area of said orifice is restricted to provide an optimum range of velocity of the fluid for reduced rates of flow thereof to insure thorough mixing of the fluid and liquid, said closure being lifted additionally during the second stage by a greater pressure than said predetermined pressure to enlarge the area of the flow passage for accommodating larger minimum and maximum flow rates of the fluid than in said first stage to provide an optimum range of velocity of the fluid for increased rates of flow thereof to insure thorough mixing of the fluid and liquid, each closure being mounted on the tray in overlying relation to each orifice and being moved completely out of engagement with said tray upon the first stage initial lifting thereof and remaining out of engagement with said tray upon reaching the second stage, thereby providing substantially uniform flow of the fluid laterally around each orifice and through the liquid surrounding each orifice during both stages of operation, the movement limiting means including travel stops for the closures and ballast members having spaced means for spacing the ballast members above the closures, the ballast members being initially spaced from the closures and travel stops and being loosely confined and freely movable, said means offering a minimum obstruction to the flow of liquid across said tray.

3. A fluid contact apparatus as set forth in claim 2 including means depending from at least one of the travel stops for directing a portion of the fluid laterally to prolong its contact with the liquid on said tray and to impart movement to said liquid in a given direction.

4. A fluid contact apparatus as set forth in claim 2 wherein the travel stops are spaced above the ballast members.

5. A fluid contact apparatus as set forth in claim 2 wherein the ballast members are interposed between their respective closures and travel stops.

6. A fluid contact apparatus as set forth in claim 2 wherein at least one of the movement limiting means includes a second ballast member having spaced means for spacing the same above the first-mentioned ballast member and being initially spaced from the travel stop and first-mentioned ballast member, the second ballast member being movable with its closure and first-mentioned ballast member upon additional lifting of said closure to provide a third stage of movement.

7. A fluid contact tray as set forth in claim 2 wherein the ballast members differ in weight so that a greater proportional increase in the pressure of the fluid is required to lift at least one of the members.

8. A fluid contact apparatus as set forth in claim 2 wherein the spaced means of the ballast members are in the form of upright legs resting on the tray.

References Cited in the file of this patent

UNITED STATES PATENTS

| 1,080,166 | Pribil | Dec. 2, 1913 |
| 1,737,710 | Erbach | Dec. 3, 1929 |
| 2,486,899 | Williams | Nov. 1, 1949 |
| 2,658,737 | Nutter | Nov. 10, 1953 |
| 2,718,900 | Nutter | Sept. 27, 1955 |
| 2,718,901 | Nutter | Sept. 27, 1955 |
| 2,772,080 | Huggins et al. | Nov. 27, 1956 |
| 2,772,081 | Hisbshman et al. | Nov. 27, 1956 |

FOREIGN PATENTS

| 199,402 | Germany | June 17, 1908 |
| 655,127 | Great Britain | July 11, 1951 |